DIODE LOADED LINE PHASE SHIFTER
Filed Dec. 30, 1966
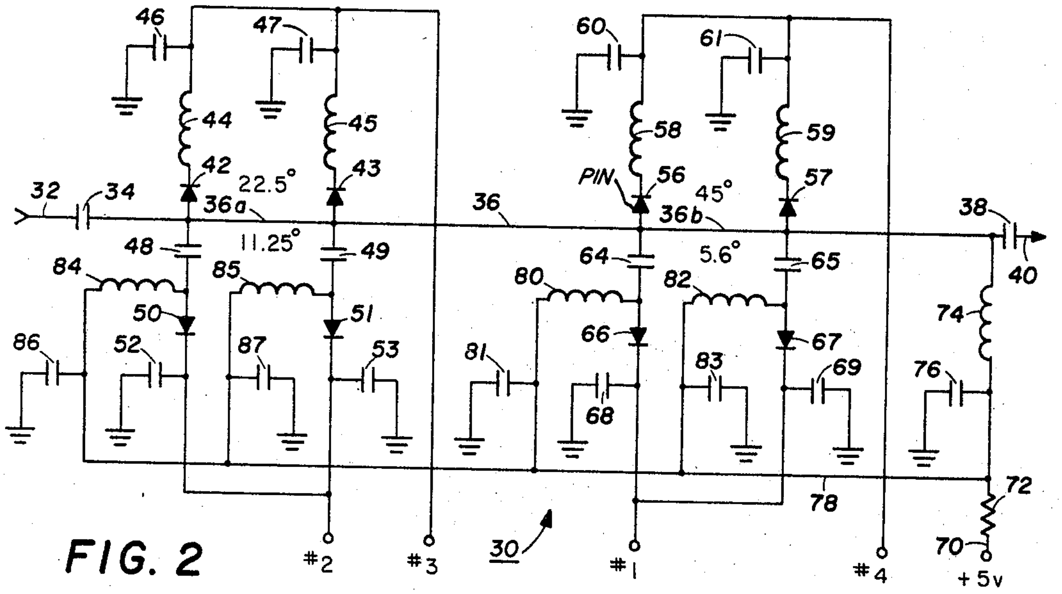
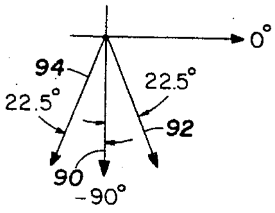
FIG. 3a
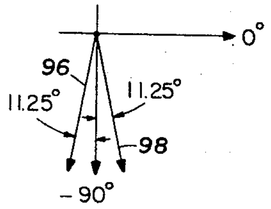
FIG. 3b
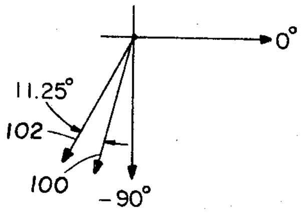
FIG. 3c
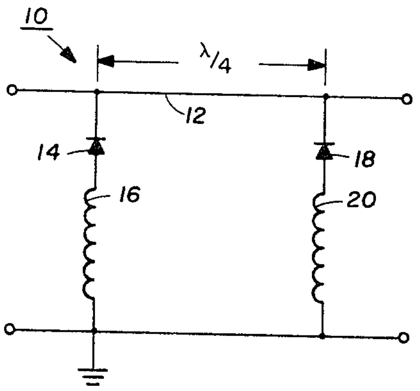
FIG. 1
PRIOR ART
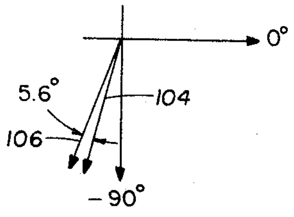
FIG. 3d
INVENTORS:
WILLIAM F. HOFFMAN
TOM M. HYLTIN
E. Mickey Hubbard
ATTORNEY 3,436,691

DIODE LOADED LINE PHASE SHIFTER

William F. Hoffman, Garland, and Tom M. Hyltin, Dallas, Tex., assignors to Texas Instruments Incorporated, Dallas, Tex., a corporation of Delaware Filed Dec. 30, 1966, Ser. No. 606,417
Int. Cl. H03h 7/30, 7/36
U.S. Cl. 333—31 15 Claims

ABSTRACT OF THE DISCLOSURE

A binary phase shift network for microwave frequencies in which a quarter wavelength transmission line is loaded at the input end of a plurality of series shunt circuits, each shunt circuit including a diode and a reactance, either inductive or capacitive, such that when the diodes are reverse biased "off" in various combinations, various phase shift angles are produced over the quarter wavelength of transmission line.

*Background of the invention*

This invention relates generally to microwave circuits, and more particularly relates to phase shift networks.

One type of phase shift network heretofore used is commonly referred to as the diode loaded line phase shifter. In this type of phase shifter, a pair of identical shunt circuits are connected to the ends of a quarter wavelength section of transmission line. Each of the series shunt circuits includes a diode and an inductor. When the diode is forward biased "on," the shunt circuit appears as a resistance in series with the inductance, and the series circuit appears as a shunt inductive reactance to the transmisison line. This results in a phase angle at the end of the quarter wavelength section of transmission line that is less than the 90° phase angle that would exist at the end of an unloaded quarter wavelength section. On the other hand, when the diode is reverse biased "off," the shunt circuit appears as a shunt capacitive reactance due to the capacitance of the diode in the reverse biased condition. As a result, the phase angle of the signal at the end of the quarter wavelength section of transmission line is some value greater than 90°. The angle between the phase angle when the diode is turned "on" and the phase angle when the diode is turned "off" is therefore the phase shift angle. The second shunt circuit is provided at the end of the quarter wavelength section of transmission line to reduce the insertion loss by minimizing the voltage standing wave ratio.

The quarter wavelength section of transmission line, together with the series shunt circuits connected at the input and output ends of the transmission line, produces only one phase shift value or one "bit" value. In order to produce a phase shift network having a number of phase shift values, a corresponding number of quarter wavelength sections of the transmission line was heretofore required. This represents a serious limitation to the microminiaturization of phase shift networks, particularly when a number of phase shift networks each having a number of phase shift values are needed in the circuit.

*Summary of invention claimed*

A phase shift network in which a plurality of series shunt paths each including a separately controllable diode are connected to the input end of a single quarter wavelength of transmission line to provide a number of different phase shift values. A phase shifter for producing a small phase shift utilizing a capacitor and inductance in series and a diode to selectively shunt the inductance. A biasing circuit for the latter type of phase shift bit.

A four bit binary phase shift network occupying only slightly more than two quarter wavelengths of transmission line and producing a total phase shift approaching 90°.

*Brief description of the drawings*

FIGURE 1 is a schematic circuit diagram of a conventional diode loaded line phase shift network;

FIGURE 2 is a schematic circuit diagram of a phase shift network in accordance with the present invention; and FIGURES 3*a*–3*d* are phase vector diagrams which serve to illustrate the operation of the phase shift network of FIGURE 2.

*Description of a preferred embodiment*

Referring now to FIGURE 1, a single bit of a conventional diode loaded line phase shifter is indicated generally by the reference numeral 10. The phase shift bit 10 includes a quarter wavelength section 12 of a transmission line. A first shunt circuit comprised of a diode 14 and an inductor 16 is connected between the input end of the quarter wavelength section 12 and ground, and an identical shunt circuit comprised of diode 18 and inductor 20 is connected between the output end of the quarter wavelength section and ground. When diodes 14 and 18 are turned "on," the diodes act as resistors in series with the inductors 16 and 20. In this condition, the series shunt circuit at the input of the quarter wavelength section 12 has an inductive reactance which causes the phase angle of a signal appearing at the output end of the quarter wavelength section 12 to have a phase angle less than the normal 90° which would result at the output end of the quarter wavelength section. On the other hand, when diodes 14 and 18 are reverse biased "off," the diodes appear as capacitors in series with the inductors and the shunt circuits have a capacitive reactance. As a result of the capacitive reactance of the first shunt circuit, the phase angle of the signal at the output end of the quarter wavelength section 12 is more than 90° behind the phase of the signal at the input end. Thus, when the diodes 14 and 18 are turned "off," the phase delay of a signal appearing at the output end of the quarter wavelength section 12 is greater than the phase delay of the same signal when the diodes are turned "on," and this difference is the phase shift value of the bit 10. The difference in the phase angles under the two conditions is determined primarily by the addition of the capacitance value of the diode 14 when reverse biased. The series shunt circuit connected at the output end of the quarter wavelength section 12 is provided merely to reduce the insertion loss by minimizing the voltage standing wave ratio.

A four bit digital phase shifter constructed in accordance with this invention is indicated generally by the reference numeral 30 in FIGURE 2. The phase shifter 30 has an input transmission line 32 which is coupled by a D.C. isolation capacitor 34 to a transmission line 36. The transmission line 36 is coupled by a second D.C. isolation capacitor 38 to an output transmission line 40.

The phase shifter 30 is comprised of 45°, 22.5°, 11.25° and 5.6° bits. The 22.5° bit is comprised of a first shunt path including a diode 42 and an inductor 44 which is coupled to ground by a bypass capacitor 46, and a second shunt path including diode 43, inductor 45 and bypass capacitor 47. The section 36*a* of line 36 between the two shunt paths including diodes 42 and 43 is approximately one quarter wavelength. The 11.25° bit is also connected across the quarter wavelength section 36*a*, and is comprised of a first shunt path including a capacitor 48, inductor 84 and bypass capacitor 86. Diode 50 and bypass capacitor 52 shunt inductance 84 when the diode is turned "on." The 11.25° bit also includes a second identical shunt network including capacitor 49, inductor 85, capacitor 87, diode 51, and capacitor 53. The 45° bit is comprised of a first shunt path including diode 56, inductor 58, and bypass capacitor 60, and a second shunt path comprised of diode 57, inductor 59, and bypass capacitor 61. The section **36*b* of line 36 between diodes 56 and 57 is also about one quarter wavelength. The 5.6° bit is also connected across the quarter wavelength section 36*b* and is comprised of a first shunt network including capacitor 64, inductor 80, capacitor 81, diode 66, and capacitor 68, and a second identical shunt network including capacitor 65, inductor 82, capacitor 83, diode 67, and bypass capacitor 69**.

The transmission line 36 between bypass capacitor 34 and bypass capacitor 38 is biased to about +1.0 volt from the +5.0 volt D.C. supply source at terminal 70 through a resistor 72 and a quarter wavelength choke 74. A bypass capacitor 76 couples the end of choke 74 to ground so that an RF open circuit is reflected to the junction between the choke 74 and the transmission line 36.

Diodes 42 and 43 of the 22.5° phase shift bits are forward biased "on" when logic input #3 is at a logic "0" level of about +0.2 volt, and are reverse biased "off" when logic input #3 is at a logic "1" level of about +4.0 volts. Similarly, diodes 56 and 57 are forward biased "on" when logic input #4 is at a logic "0" level, and are reverse biased "off" when input #4 is at a logic "1" level.

Diodes 66 and 67 of the 5.6° bit are forward biased "on" when logic input #1 is at a logic "0" level of +0.2 volt because conductor 78 is at about +1.0 volt level. This is achieved through the D.C. circuit extending from conductor 78 through inductors 80 and 82 and the diodes to logic input #1. Diodes 66 and 67 are reverse biased "off" when logic input #1 is at a logic "1" level of +4.0 volts. Bypass capacitors 81 and 83 isolate the D.C. bias voltage from the RF portion of the network. Similarly, diodes 50 and 51 of the 11.25° bit may be forward biased by current from conductor 78 through inductors 84 and 85 and the respective diodes to logic input #2 when the logic input #2 is at a logic "0" level, and are reverse biased "off" when logic input #2 is at the logic "1" level. Again, bypass capacitors 86 and 87 RF couple the inductors 84 and 85 to ground so that the D.C. voltage can be injected to bias the diodes 50 and 51 without interfering with the RF operation of the circuit.

The eight diodes of the phase shift network 30 are preferably PIN diodes which under reverse bias assume a relatively constant capacitive reactance due to the fact that the depletion layer extends between heavily doped p-type and n-type regions, thereby establishing a truly intrinsic region of substantially constant width.

The operation of the 45° bit is illustrated in FIGURE 3*a*. The normal phase shift resulting at the end of a quarter wavelength of transmission line, such as transmission line **36*b*, is represented by the phase vector 90 at −90°. When the diode 56 is turned "on," however, the shunt path including inductor 58 and bypass capacitor 60 has an inductive reactance (because diode 56 acts merely as as resistance), and the phase delay at the end of the quarter wavelength of line 36*b* is actually that represented by the phase vector 92. By properly selecting the value of the inductance 58, the angle between the −90° vector and vector 92 can be made to be 22.5°. When diode 56 is turned "off" and becomes a capacitance, however, the shunt circuit appears as a capacitive reactance resulting in a phase shift represented by the vector 94. By properly selecting the reverse bias capacitance of diode 56, the vector 94 may be disposed 22.5° from the −90° vector. As a result, the phase delay at the end of the quarter wavelength section 36*b* may be switched through a 45° angle merely by switching diode 56 "off." The shunt path including diode 57, inductor 59 and bypass capacitor 61 is provided merely to reduce insertion loss by minimizing the voltage standing wave ratio. Thus, it will be noted that when logic input #4 is at a logic "1" level, the 45° phase bit is effectively switched into the circuit so that the signal propagating through strip transmission line 32** will be delayed by 45° when compared to the delay in the same signal when the diodes are forward biased "on."

The 22.5° bit operates in precisely the same manner as the 45° bit, except that the capacitive values of the diodes 42 and 43 and the inductive values of inductors 44 and 45 are selected so as to result in a total 22.5° shift as represented by the phase vectors 96 and 98 in FIGURE 3*b*.

The 11.25° phase bit and the 5.6° phase bit, however, operate on a different principle. When the diode 50, for example, is biased "on" by a logic "0" level on input #2, the RF path is essentially through capacitor 48, diode 50, and bypass capacitor 52, and inductor 84 is shunted by the diode. The shunt network then has a relatively high capacitive reactance which results in a phase shift represented by phase vector 100 in FIGURE 3*c*. Then when input #2 goes to a logic "1" level, diode 50 is biased "off." Then the RF path is through capacitor 48, inductor 84 and bypass capacitor 86. This reduces the net capacitive reactance of the shunt network, resulting in a phase shift represented by phase vector 102. By properly selecting the values of the capacitor 48 and inductor 84, the phase shift angle between vectors 100 and 102 can be 11.25°. The 5.6° phase bit operates in the same manner, except that the values of the capacitor 64 and inductor 80 are chosen to achieve a 5.6° phase shift as represented by phase vectors 104 and 106 in FIGURE 3*d*.

The use of the shunt network illustrated for the lower value bits is necessitated because the diodes suitable for use at the higher operating frequencies do not have a sufficiently large capacitance to achieve the relatively small phase shift angle necessary to operate symmetrically about the 90° phase vector. Thus, the 11.25° and 5.6° bits are operated wholly within the capacitive reactance region.

It will be noted that the shunt circuit controlled by diode 42 and the shunt circuit controlled by diode 50 are connected in series from the same point in the circuit. Accordingly, the values of these circuits must be chosen so that the composite effect of the two parallel shunt circuits will achieve the desired phase shift for each of the four possible combinations of states of the switching diodes 42 and 50. Similarly, the values of the shunt circuits including diodes 43 and 51, diodes 56 and 66, and diodes 57 and 67 all must be chosen while taking into consideration the various combinations possible in the operation of the system. These values can be selected, however, using conventional circuit analysis equations known in the art.

Thus, it will be noted that a binary phase shift network has been described which has four bits. The binary phase shift network can be operated by a binary counter to produce a phase shift varying from 0° to 84.35° in approximate 5.6° increments. Yet when fabricated in strip transmission line form, the binary phase shift network occupies only slightly more than two quarter wavelengths of transmission line, thus shortening the length of the circuit in half when compared to the conventional diode loaded line phase shift network. In addition, the use of capacitors rather than inductors permits very small phase shift angles at S-band frequencies when the circuit is fabricated in hybrid form using strip transmission lines and PIN silicon diodes.

Although a preferred embodiment of the invention has been described in detail, it is to be understood that various changes, substitutions and alterations can be made therein without departing from the spirit and scope of the invention as defined by the appended claims.

What is claimed is:

1. In a phas shift network, the combination of:
(a) a section of transmission line approximately one quarter wavelength long having an input end and an output end,
(b) a first set of parallel shunt networks directly electrically connected to said input end of said section and RF coupling the input end of the section to ground, each shunt network of the first set including a diode and reactance means connected such that when the diode is switched "on" the shunt network has one reactance value, and when the diode is switched "off" the shunt network has another reactance value,
(c) a second set of parallel shunt networks directly electrically connected to said output end of said section and RF coupling the output end of the section to ground, each shunt network of the second set matching one of the first set of shunt networks to reduce the voltage standing wave ratio, and
(d) means for selectively biasing the diode of each shunt network to an "on" state and to an "off" state to control the reactance values of the respective shunt networks connected across said section and thereby control the phase shift introduced to a signal propagating through the section of transmission line.

2. The combination defined in claim 1 wherein the reactance of at least one of the shunt networks of the first set and the reactance of the matching shunt network of the second set are inductors connected in series with the respective diodes, and the capacitive reactance of the diode when switched "off" shifts the reactance of the network in only one predetermined direction.

3. The combination defined in claim 1 wherein the reactance of at least one of the shunt networks of the first set and the reactance of the matching shunt network of the second set is an inductor connected in series with the respective diode and the reactance of another of the shunt networks of the first set and the reactance of the matching shunt network of the second set is a capacitor and an inductor connected in series and a diode connected to shunt one of said capacitor and inductor when turned "on."

4. The combination defined in claim 1 wherein
(a) at least one of the shunt networks of the first set and the matching shunt network of the second set comprises a diode and an inductor connected in a series circuit that is D.C. connected to the section and RF coupled to ground by a bypass capacitor, and
(b) the means for selectively biasing each of the diodes "on" and "off" comprises a quarter wavelength choke D.C. coupled to the transmission line at one end and RF coupled to ground at the other end whereby a D.C. biasing potential may be applied from the bypass capacitors of the shunt networks to the end of the quarter wavelength choke that is RF shorted to ground.

5 The combination defined in claim 1 wherein at least one of the shunt networks of the first set and the matching shunt network of the second set each comprise a series circuit including a capacitor and an inductor, the capacitor being connected to the section of transmission line and the inductor being coupled to ground by a bypass capacitor, and the diode being connected to RF short the inductor through a bypass capacitor to ground, whereby the diode may be selectively biased "on" and "off" by a potential applied across the circuit including the inductor and the diode.

6. The combination defined in claim 1 wherein the reactance of at least one of the shunt networks of the first set and the matching shunt network of the second set is a capacitor and an inductor connected in series, and the diode is connected to shunt one of said capacitor and said inductor when biased to an "on" state to vary the reactance of the network.

7. The combination defined in claim 6 wherein the capacitor is connected to the section of transmission line and the diode is connected to shunt the inductor when said diode is in an "off" state in a manner to lower the capacitive reactance of the network relative to its capacitive reactance when the diode is in an "on" state.

8. A binary phase shift network comprising the combination of
(a) first and second serially connected sections of transmission lines each approximately one quarter wavelength long, each having an input end and an output end,
(b) a first phase shift bit comprised of first and second shunt networks RF coupling the input and output ends, respectively, of the first section to ground, each of the first and second shunt paths including a diode and an inductor connected in series, and means for selectively forward biasing the diodes "on" or reverse biasing the diodes "off,"
(c) a second phase shift bit comprised of third and fourth shunt networks coupling the input and output ends, respectively, of the first section to ground, each of the third and fourth shunt networks including a capacitor and an inductor connected in series and a diode connected to shunt one of said capacitor and said inductor out of the circuit, and means for selectively forward biasing the diodes "on" or reverse biasing the diodes "off,"
(d) a third phase shift bit comprised of fifth and sixth shunt networks coupling the input and output ends, respectively, of the second section to ground, each of the fifth and sixth shunt networks including a diode and an inductor connected in series, and means for selectively forward biasing the diodes "on" or reverse biasing the diodes "off,"
(e) a fourth phase shift bit comprised of seventh and eighth shunt networks coupling the input and output ends, respectively, of the second section to ground, each of the seventh and eighth shunt networks including a capacitor and an inductor connected in series and a diode connected to shunt one of said capacitor and said inductor out of the circuit, and means for selectively forward biasing the diodes "on" or reverse biasing the diodes "off,"
(f) the reactance values of the diodes of the shunt networks when the respective diodes are in one state being selected to provide selected phase shift values when compared to the phase shift when the respective diodes are in the other state.

9. The combination defined in claim 8 wherein the fourth phase shift bit produces the minimum phase shift, the second phase shift bit produces twice the phase shift of the fourth phase shift bit, the first phase shift bit produces twice the phase shift of the second phase shift bit, and the third phase shift bit produces twice the phase shift of the first phase shift bit.

10. In a phase shift network, the combination of
(a) a section of transmission line approximately one quarter wavelength long,
(b) first and second shunt networks directly electrically connected to the opposite ends of said section of transmission line and RF coupling the opposite ends of the section of transmission line to ground, each shunt network comprising a capacitance and an inductance connected in series and a diode RF coupling the junction between the capacitance and inductance to ground to shunt one of said capacitance and said inductance out of the circuit when the diode is biased "on," and
(c) circuit means for selectively biasing the diodes "on" and "off" to vary the reactance of the respective shunt networks and thereby produce a relative phase shift in a signal propagating through the section of transmission line.

11. The combination defined in claim 10 wherein the reactance of the shunt networks is capacitive for both states of the diodes.

12. The combination defined in claim 10 wherein the capacitance of each shunt network is coupled to the section of transmission line and the diodes are biased through the circuit including the inductor and the diode.

13. The combination defined in claim 10 wherein the inductance of each shunt network is coupled to the section of transmission line and the diodes are forward biased from the section of transmission line through the diode to ground to shunt the capacitance from the circuit.

14. The combination defined in claim 10 wherein the reactance of each of the shunt networks is capacitive for one state of the diode and inductive for the other state.

15. The combination defined in claim 10 wherein the reactance of each of the shunt networks is inductive for both states of the diode.

References Cited

UNITED STATES PATENTS

| | | | |
|---|---|---|---|
| 3,177,433 | 4/1965 | Simon et al. | 333—29 X |
| 2,743,367 | 4/1956 | Felch et al. | 333—29 X |
| 3,290,624 | 12/1966 | Hines | 333—31 |

ELI LIEBERMAN, *Primary Examiner.*

PAUL L. GENSLER, *Assistant Examiner.*

U.S. Cl. X.R.

328—155; 333—32